Feb. 3. 1925.
R. L. WARD
LAND SCRAPER
Filed May 25, 1922
1,525,345
2 Sheets-Sheet 2
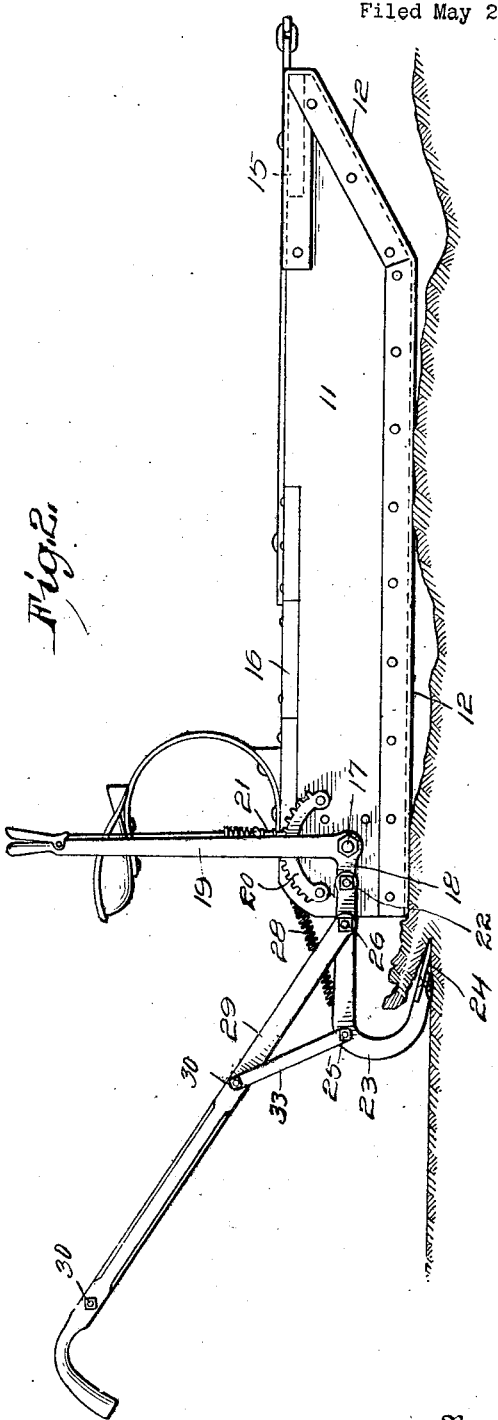
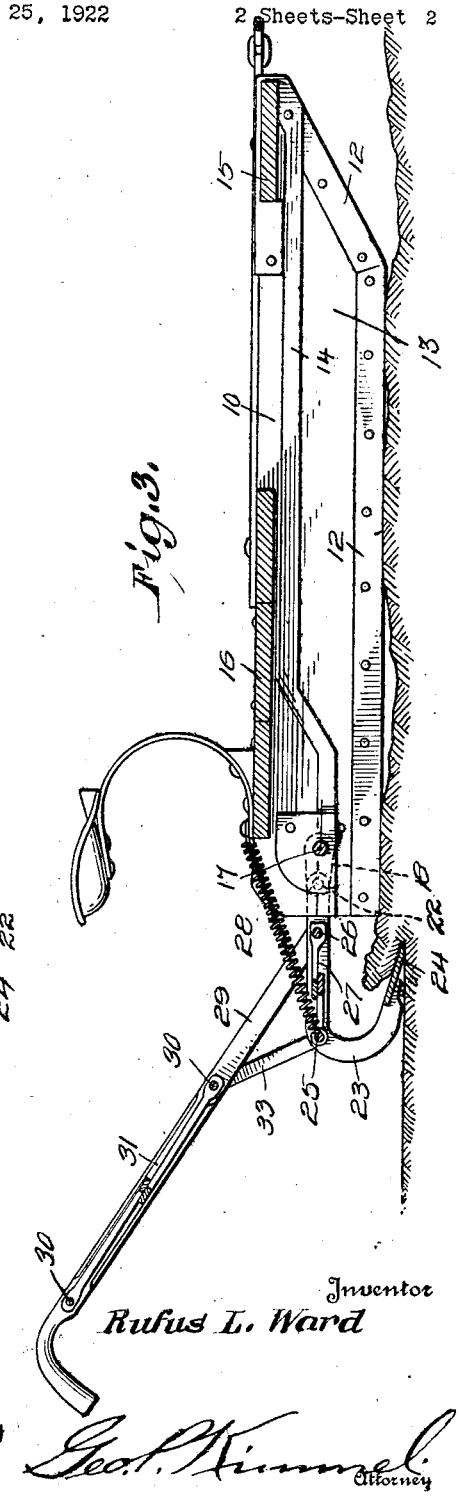
Inventor
Rufus L. Ward
By Geo. P. Kimmel
Attorney Patented Feb. 3, 1925.

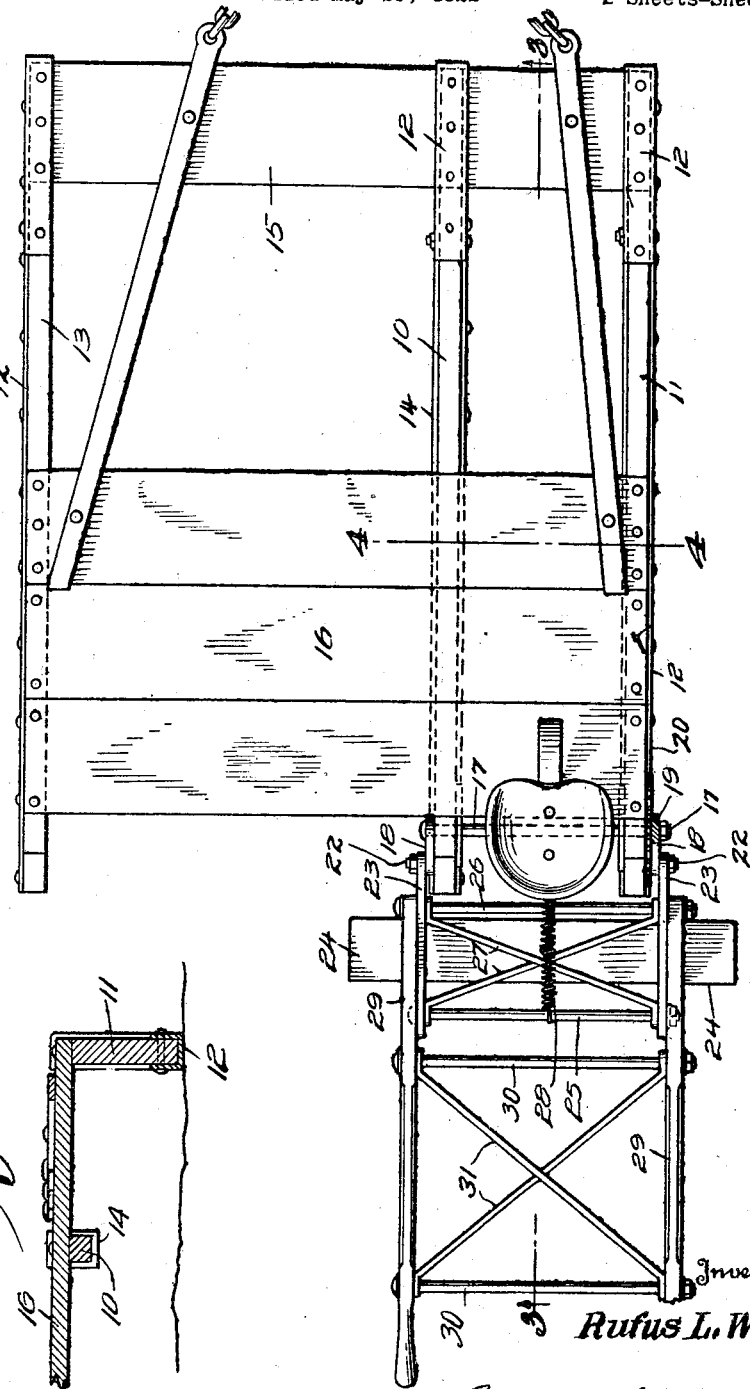

1,525,345

UNITED STATES PATENT OFFICE.

RUFUS L. WARD, OF CLAREMORE, OKLAHOMA.

LAND SCRAPER.

Application filed May 25, 1922. Serial No. 563,510.

*To all whom it may concern:*

Be it known that I, RUFUS L. WARD, a citizen of the United States, residing at Claremore, in the county of Rogers and State of Oklahoma, have invented certain new and useful Improvements in Land Scrapers, of which the following is a specification.

This invention relates to earth graders or levelers, and has for one of its objects to improve the construction and increase the efficiency and utility of devices of this character.

Another object of the invention is to provide a device of this character having means whereby the depths of operation of the scraper elements may be readily controlled by the driver from his seat.

With these and other objects in view the invention consists in certain novel features of construction as hereinafter shown and described and then specifically pointed out in the claims, and in the drawings illustrative of the preferred embodiment of the invention:—

Figure 1 is a plan view.

Fig. 2 is a side elevation.

Fig. 3 is a longitudinal section on the line 3—3 of Fig. 1.

Fig. 4 is a transverse sectional detail on the line 4—4 of Fig. 1.

This invention relates to the class of road scrapers, and levelers, more particularly designed for use in levelling or "planing" the ground preparatory to the erection of oil tanks, certain classes of buildings, and the like, and comprises coacting coaster runners 11 and 13, preferably of wood, and inclined at the forward ends to enable them to be freely drawn over the ground, and provided with suitable metal shoes represented at 12.

The runner 13 operates as an outrigger, to steady the movement, and for the purpose of this description, the runner 11 will be referred to as the main runner, and the runner 13 as the supplemental or outrigger runner. At their forward ends the runners 11 and 13 are coupled by a flat member 15, preferably of wood, and connected at its ends to the runners by the overturned terminals of the shoes 12.

The rear portions of the runners 11 and 13 are connected by a platform device 16, as shown.

Supported beneath the deck or platform 16 and the coupling member 15, is a support 10 spaced from the runners 11 and 13, and nearer to the main runner 11 than to the supplemental runner 13, as shown in Fig. 1, and protected by a shoe 14.

Extending through the main runner 11 and the support 10 and rearwardly of the platform 16, is a rock shaft 17 having short lever arms 18 attached to the ends externally of the main runner 11 and the support 10, one of the lever arms having an upwardly directed operating lever 19.

Attached to the runner 11 is a notched segment 20, with which a pawl device 21 carried by the lever 19 engages, to control the position of the lever. Pivoted at 22 to the shorter lever arms are beam members 23, the latter curving forwardly at their rear ends and connected by a knife edged scraper element 24. The beam members 23 are coupled and stiffened by spaced tie rods 25 and 26 and oblique braces 27.

A spring 28 is connected at its ends to the rod 25 and the platform 16, and operates to maintain the beam members 23 and the scraper element 24 carried thereby normally and yieldably in elevated or inoperative position.

Attached to the beam members, preferably at the ends of the rod 26, are handles 29 the latter being coupled by tie rods 30 and obliquely directed braces 31.

Small braces 33 are also connected respectively to the rod 25 and to the adjacent tie rod 30.

By this means the beam members are rigidly coupled to each other while the handle members are likewise rigidly coupled to each other and to the beam members. The scraper blade 24, is longer than the distance between the runner member 11 and the support 10, and thus projects at the ends beyond the lines of these members. The scraper blade projecting at one end beyond the runner 11, enables the scraper to be operated close to an object, for instance, a curb member when grading streets, or when levelling the earth close to a wall, or the limit of the line of excavation or levelling.

The runner member 13 being spaced from the inner end of the scraper blade 24, operates as an "outrigger" to steady the action and hold the scraper in a more level position.

With an apparatus thus constructed the ground may be levelled or "planed" and put in condition for the operation of a roller whereby the soil may be packed and rendered hard and uniform to receive the tank, building supports or the like.

The preferred embodiment of the invention is disclosed in the drawings and set forth in the specification, but it will be understood that modifications within the scope of the claimed invention may be made in the construction without departing from the principle of the invention or sacrificing any of its advantages.

Having thus described the invention what is claimed as new is:—

1. In an apparatus of the class described, a platform, a main runner supported from said platform, an outrigger runner supported from said platform and spaced from the main runner, a draft appliance connected to said platform, a rock shaft supported by said main runner and the platform, lever arms connected for movement by said rock shaft, a scraper device including spaced beam elements pivoted at their forward ends to said lever arms, a spring operating to movably hold said scraper device in elevated position, controlling handles connected to said beam elements and operative to depress said scraper device against the resistance of said spring, and means for operating said rock shaft and locking the same in adjusted position to control the action of said scraper device.

2. In an apparatus of the class described, a platform, a main runner and a supplemental runner supported by said platform, said supplementary runner operating as an outrigger to steady the movement, a support depending from said platform intermediate the runners, a rock shaft journalled through the main runner and the intermediate support, lever arms connected to said rock shaft in spaced relation, a scraper device including spaced beam elements swingingly coupled respectively to said lever arms, a spring connecting said scraper device to said platform and exerting its force to normally maintain said scraper device in inoperative position, and controlling handles connected to said scraper device and operative to depress the scraper device against the resistance of the spring.

In testimony whereof, I affix my signature hereto.

RUFUS L. WARD.